Figure 1:
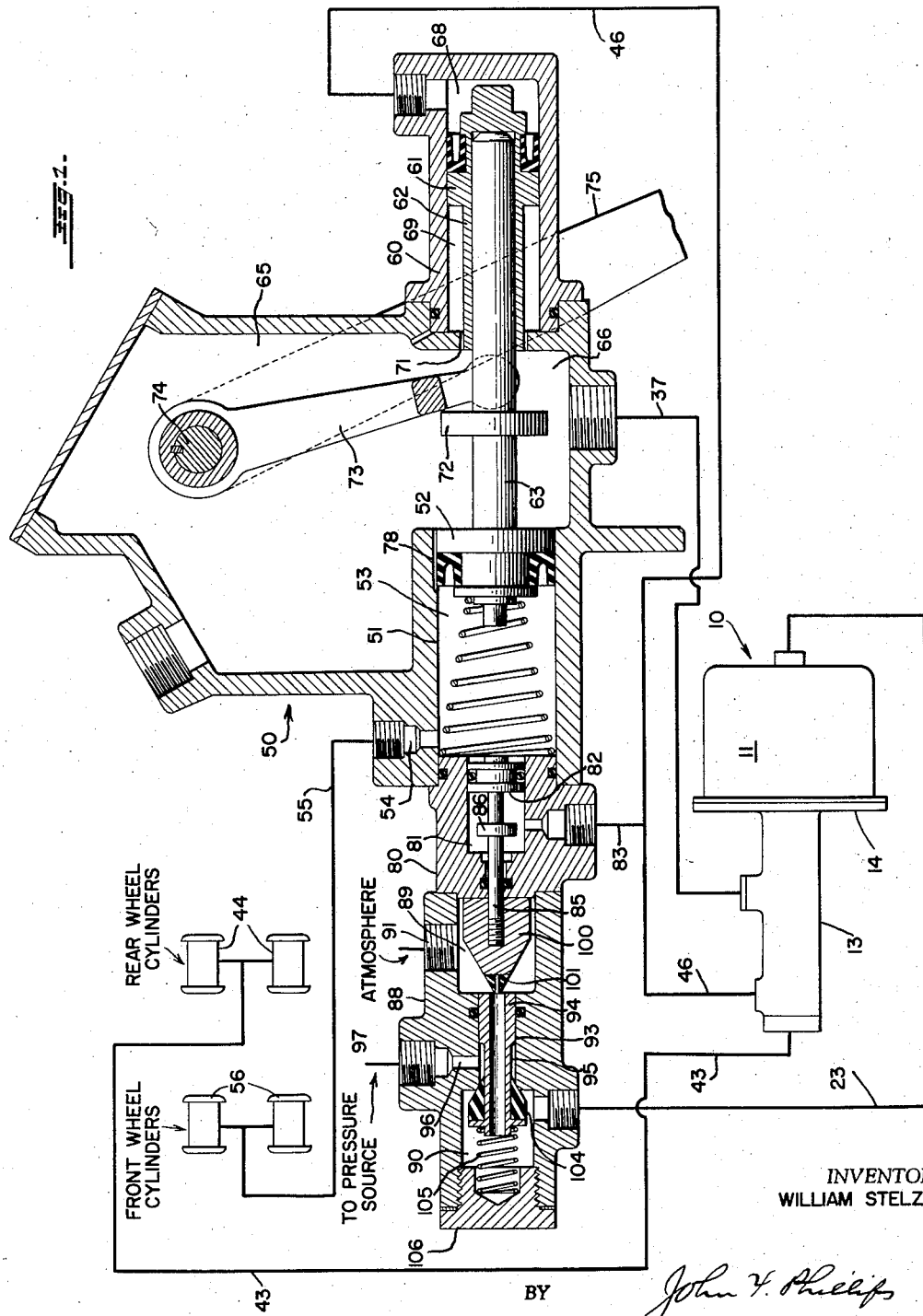

April 28, 1959 W. STELZER 2,883,830
BOOSTER BRAKE SYSTEM
Filed Jan. 15, 1957 2 Sheets-Sheet 2

INVENTOR
WILLIAM STELZER

BY *John F. Phillips*

ATTORNEY

United States Patent Office 2,883,830
Patented Apr. 28, 1959

2,883,830

BOOSTER BRAKE SYSTEM

William Stelzer, Bloomfield Hills, Mich., assignor to Kelsey-Hayes Company, Detroit, Mich., a corporation of Delaware Application January 15, 1957, Serial No. 634,250

9 Claims. (Cl. 60—54.5)

This invention relates to a booster brake system for motor vehicles.

An important object of the invention is to provide a novel type of system wherein pedal operation of a plunger displaces fluid into one set of wheel cylinders, particularly the front wheel cylinders of a passenger vehicle, and wherein the building up of pressure by such pedal operation operates the valve mechanism of a booster motor to apply hydraulic fluid under pressure to the other wheel cylinders.

A further object is to provide such a mechanism wherein novel means is employed for utilizing booster-generated pressures for reacting against the master cylinder pressures and thus against the pedal operated plunger of the master cylinder, thus providing the pedal with the necessary "feel."

A further object is to provide such a system wherein the pedal operated master cylinder, the reaction means and the valve mechanism for the booster motor are all arranged in axial alinement to simplify the transmission of reaction forces and valve operating forces for controlling the mechanism.

A further object is to provide novel means for utilizing booster-generated hydraulic pressures for assisting the operator in transmitting forces to the pedal operated master cylinder plunger.

A further object is to provide a system of this character which lends itself particularly well to operation from a source of super-atmospheric pressure rather than the vacuum of the intake manifold which is commonly employed for operating passenger vehicle booster mechanisms.

A further object is to provide such a system wherein poppet valving is provided for the booster motor and wherein such valving is of a highly simplified and efficient type.

Other objects and advantages of the invention will become apparent during the course of the following description.

Figure 2:
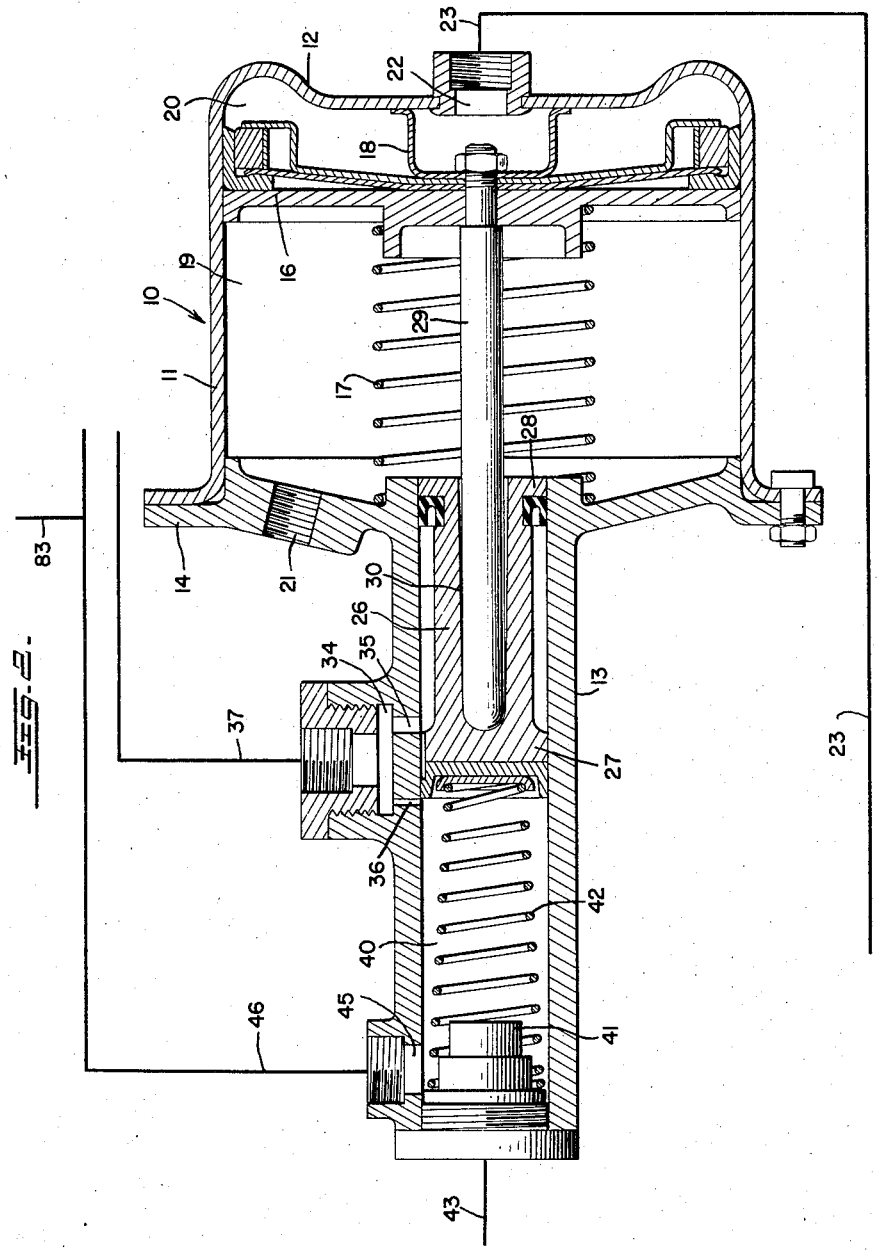

In the drawings I have shown one embodiment of the invention. In this showing:

Figure 1 is an axial sectional view through the pedal operated master cylinder and associated elements, the remainder of this system, including the booster mechanism, being diagrammatically illustrated; and Figure 2 is an enlarged sectional view of the booster motor.

Referring to Figure 2, one type of booster motor is illustrated and designated by the numeral 10 and comprises a cylinder 11 having a preferably integral head 12 at one end thereof. At the other end of the motor is arranged an axially extending preferably die-cast cylinder 13 having a head 14 closing the adjacent end of the cylinder 10.

A piston 16 is mounted to reciprocate in the cylinder 11 and a return spring 17 biases the piston to the normal off position shown, such movement being limited by a stop member 18 carried by the piston 16 and engageable with the head 12. The piston 16 divides the motor to form a constant pressure chamber 19 and a variable pressure chamber 20. In the present instance, the motor 10 is shown as being of a type operated by super-atmospheric pressure, in which case atmospheric pressure is maintained in the chamber 19 through a port 21 preferably provided with an air cleaner (not shown). Pressure in the chamber 20 is controlled through a port 22 to which is connected one end of a conduit 23 controlled by a valve mechanism to be described.

The cylinder 13 forms the high pressure master cylinder for the system and is provided therein with a plunger 26 having heads 27 and 28 sealed in the cylinder 13. A push rod 29 is fixed at one end to the piston 16 and has its other end projecting into a recess 30 in the plunger 26 to transmit movement thereto.

The body of the cylinder 13 is provided with a hydraulic chamber 34 communicating through a port 35 with the interior of the cylinder 13 back of the head 27. A compensating port 36 communicates with the chamber 34 and with the interior of the master cylinder just in advance of the plunger 26, such port being conventional, as will be apparent. Fluid is supplied to the chamber 34 from a reservoir to be referred to, through a pipe 37.

The plunger 26 operates to displace fluid under pressure from a chamber 40 in advance of the plunger 26 and the outlet of the chamber 40 is provided with a conventional residual pressure valve 41. A spring 42 in the chamber 40 biases the plunger 26 to the normal off position shown. Fluid flows past the residual pressure valve 41 through a line 43 leading to the rear wheel cylinders 44 (Figure 1) of the vehicle.

Adjacent the outlet end thereof, the cylinder 13 is provided with a port 45 leading to one end of a pipe 46 for a purpose to be described.

Referring to Figure 1, the numeral 50 designates a preferably integral die-case body as a whole the lower portion of which comprises a cylinder 51 in which is reciprocable a sealed plunger 52. The cylinder 51 forms ahead of the plunger 52 a hydraulic master cylinder chamber 53 having an outlet 54. This outlet is connected through pipe lines 55 to the front wheel cylinders 56 of the vehicle.

The rear wall of the body 50 has secured thereto the forward end of a cylinder 60 in which is reciprocable a sealed piston 61 having a forwardly extending sleeve 62 in which is arranged the rear end of a rod 63 fixed at its forward end to the plunger 52. The upper portion of the body 50 forms a reservoir 65 having between the two cylinders 51 and 60 a sump 66 communicating with the other end of the line 37 previously described, to supply hydraulic fluid to the chamber 34 (Figure 2).

The piston 61 divides the cylinder 60 to form a pair of chambers 68 and 69, the former of which is supplied with fluid through the other end of the line 46, previously described. The chamber 69 communicates with the reservoir 65 through a space 71 around the sleeve 62.

The rod 63 is provided with a collar 72 engaged by the yoked lower end of an arm 73 mounted for turning movement with a shaft 74. This shaft is operated by a conventional brake pedal 75. This pedal is shown out of position in Figure 1 as being connected to the shaft 74, but it will be apparent in practice that the pedal 75 is arranged in the driver's compartment of the vehicle and connected mechanically in any suitable manner to rock the shaft 74. The rocking of such shaft obviously will move the plunger 52 to the left in Figure 1.

Communication is normally established between the chamber 53 and reservoir 65 through a groove 78 formed in the wall of the cylinder 51, thus serving to compensate for any loss of fluid from the chamber 53. Movement of the plunger 52 to the left in Figure 1 obviously immediately closes the groove 78.

Fixed to the left-hand end of the cylinder 51 is a housing 80 having a cylindrical chamber 81 therein in which is slidable a plunger 82. The chamber 81 communicates through a branch pipe 83 with the pipe 46 previously described. The plunger 82 is provided with a stem 85 having a collar 86 therein engageable with the end wall of the chamber 81 to limit movement of the plunger 82 to the left in Figure 1.

A valve housing 88 is arranged in axial alinement with the housing 80 and is fixed thereto in any suitable manner. The valve housing is provided in opposite ends thereof with coaxial chambers 89 and 90. The chamber 89 communicates with the atmosphere through a port 91, preferably provided with an air cleaner, and the chamber 90 communicates with the other end of the pipe 23 leading to the motor chamber 20 (Figure 2).

The chambers 89 and 90 are connected by a bore 93 in which is slidable an open-ended tube 94 having a reduced forward end 95 forming a space communicating with a port 96 to which is connected a pipe 97 leading from a suitable source of super-atmospheric pressure. The present mechanism is adapted to be used on the coming types of motor vehicles provided with air bags as the resilient supporting means therefor, and such vehicles are provided with compressors and accumulators to supply a source of pressure for the air bags and for the present mechanism.

A valve head 100 is carried by the stem 85 in the chamber 89 and is provided at its forward end with a conical rubber or other resilient poppet valve 101. This valve normally is in the open position shown in Figure 1 and is movable forwardly to close the opening through the tube 94 to disconnect the chambers 89 and 90. The valve body 100 normally seats against the forward end of the housing 80.

A rubber or similar conical poppet valve 104 is carried by the forward end of the tube 94 and normally seats in the forward end of the bore 93. The valve 104 is biased to closed position by a spring 105 the forward end of which seats against a plug 106 closing the forward end of the chamber 90.

*Operation*

The parts normally occupy the positions shown in the drawings. When the brakes are to be applied, the operator will depress the pedal 75 to swing the arm 73 and thus move the plunger 52. This operation performs two functions, namely, the displacing of fluid from the chamber 53 through lines 55 to the front wheel cylinders, and the displacement of the valve operating plunger 82 to the left. The plunger 82 moves freely to engage the valve 101 with the rear end of the tube 94, whereupon the plunger 82 encounters the relatively light resistance of the return spring 105. Thereupon, fluid is displaced from the chamber 53 to move the front brake shoes into engagement with the brake drums.

It will be apparent that with the parts in their normal off positions, the motor chamber 20 will be in communication with the atmosphere through line 23, chamber 90, the interior of the tube 94, chamber 89, and port 91. Such communication with the atmosphere is cut off immediately upon the closing of the valve 101. Further forward movement of the plunger 82 unseats the valve 104, thus connecting the high pressure port 96 with the chamber 90 to admit super-atmospheric pressure through the line 23 to the motor chamber 20. The motor piston 16 then starts to move to the left in Figure 2, immediately closing the compensating port 36 and generating pressure in the chamber 40. Fluid will be displaced from such chamber through lines 43 to the rear wheel cylinders 44. Fluid also will be displaced from the chamber 40 through lines 46 and 83 to the bore 81 to react against the plunger 82 to tend to prevent this plunger from moving further toward the left. Fluid flowing through the line 46 also will flow into the chamber 68 of the cylinder 60 and the pressure acting on the plunger 61 will assist the operator in moving the plunger 52 toward the left to generate pressure in the chamber 53.

It will be apparent that pressure in the chamber 81 opposes the pressure in the chamber 53 acting on the plunger 82 to tend to move the plunger 82 toward the left. This hydraulic opposition tends to reverse the movement of the plunger 82 and thereby provides a follow-up action of the valve mechanism relative to pressure built up in the chamber 53 and hence relative to movement of the plunger 52. In other words, if the pedal 73 is moved through a predetermined intermediate portion of its stroke and movement of the brake pedal is arrested, the building up of pressure in the chamber 81 will move the plunger 82 toward the right a sufficient distance to close the high pressure valve 104 and thus return the valve parts to the lap position. Thus a perfect follow-up action of the valve mechanism is provided.

While the operator is assisted in the preferred form of the invention in moving the plunger 52 by motor generated pressures in the chamber 68, he nevertheless performs a part of the work of generating pressures in the chamber 53 and thus the brake pedal is provided with direct hydraulic reaction which is always proportionate to brake application. Movement of the plunger 82 to the left is limited by the collar 86 upon a sudden operation of the brake pedal. As pressures build up in the chamber 81, the collar 86 will move toward the right to return the valves to lap position at the proper time.

When the brake pedal is released after a brake application, the parts will be immediately returned to normal position. Force no longer will be applied to the valve 104 and the spring 105 will close the valve 104. There will be two forces present tending to return the valve 101 to its normal open position. Air pressure previously built up in the motor chamber 20 will blow through the interior of the tube 94 to unseat the valve 101. In the second place, a reduction in pressure in the chamber 53 incident to return movement of the plunger 52 to normal position will subject the plunger 82 to differential pressures to move it to the right to return the valve body 100 to its normal position.

From the foregoing it will be apparent that a dual brake system is provided in that the chambers 40 (Figure 2) and 53 (Figure 1) separately supply hydraulic fluid to the two sets of wheel cylinders. This arrangement provides for an adequate displacement of hydraulic fluid for the full operation of the brakes. The cylinder 51 may be somewhat smaller than a conventional pedal operated master cylinder since it supplies fluid to only two wheel cylinders, but the capacity of the chamber 51 will be proportionately greater for two wheel cylinders than a conventional master cylinder is with respect to all four wheel cylinders, thus assuring an adequate displacement of fluid. In the event of a failure of power in the source, the operation of the valve mechanism will fail to operate the motor. Under such conditions, the plunger 82, upon operation of the brake pedal, will move to its limit of movement, after which pedal forces will generate pressures in the chamber 53 to apply the front wheel brakes for an emergency stop.

It also will be apparent that the booster motor is capable of being utilized not only for operating the rear wheel cylinders of a passenger vehicle, but also for assisting the operator in moving the plunger 52, thus providing adequate power for applying the brakes with minimum effort on the part of the operator. All of the parts shown in the sectional view in Figure 1 are arranged in axial alinement, thus simplifying the design of the apparatus as well as installation thereof, and adding to the ease and efficiency of operation of the parts.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake system for a motor vehicle having a plurality of sets of wheel cylinders, comprising a master cylinder connected to one set of wheel cylinders, a pedal operable plunger movable in said master cylinder to displace fluid therefrom, pedal operable means for moving said plunger, a differential fluid pressure motor having a pressure responsive unit, a high pressure hydraulic chamber, a high pressure plunger movable in such chamber to displace fluid therefrom and being connected to said pressure responsive unit, means connecting said high pressure chamber to the other set of wheel cylinders, a valve mechanism controlling communication between said motor and sources of different pressures and normally balancing pressures in said motor, means exposed to pressure in said master cylinder and connected to said valve mechanism to actuate the latter to operate said motor upon the building up of pressure in said master cylinder, a second cylinder axially alined with said master cylinder, a plunger in said second cylinder forming with one end thereof a booster chamber, means connecting said booster chamber to said high pressure chamber, and means connecting said last-named plunger to said first-named plunger whereby increases in pressure in said booster chamber move said last-named plunger to assist said pedal operable means in displacing fluid from said master cylinder.

2. A system according to claim 1 wherein said means for actuating said valve mechanism comprises a cylinder, and a control plunger in such cylinder defining therewith a chamber communicating with said high pressure chamber, said control plunger being exposed to pressure in said master cylinder and being connected to said valve mechanism.

3. A booster brake system for a motor vehicle having a pair of sets of wheel cylinders, comprising a master cylinder connected to one set of wheel cylinders, a plunger movable in said master cylinder to displace fluid therefrom, pedal operable means for actuating said plunger, a fluid pressure motor having a pressure responsive unit, a high pressure hydraulic chamber connected to the other set of wheel cylinders, a high pressure plunger movable into such chamber and connected to said pressure responsive unit, a valve mechanism for controlling said motor, said valve mechanism comprising a body having a pair of chambers and a bore therebetween coaxial with said master cylinder, one of said chambers being a low pressure chamber and the other being a variable pressure chamber, a tube slidable in said bore, one end of said tube opening into said low pressure chamber and forming a valve seat, a normally open poppet valve in said low pressure chamber engageable with said seat, a valve carried by said tube and normally engaging the end of said bore adjacent said variable pressure chamber, said variable pressure chamber being connected to said motor, said tube having a space therearound connected to a source of relatively high pressure, means exposed to pressure in said master cylinder and connected to said first-named valve to close the latter and effect movement of said tube to open said second-named valve upon the generation of pressure in said master cylinder, and fluid pressure responsive means communicating with said high pressure chamber and connected to said master cylinder plunger whereby pressures generated in said high pressure chamber assist said pedal operable means in moving said master cylinder plunger.

4. A system according to claim 3 wherein said pressure responsive means comprises a second cylinder coaxial with said master cylinder and arranged beyond the end thereof opposite said body, a booster plunger in said second cylinder forming with one end of the latter a booster chamber communicating with said high pressure chamber, and means connecting said booster plunger to said master cylinder plunger whereby pressures generated in said high pressure chamber will be communicated to said booster chamber to assist said pedal operable means in moving said master cylinder plunger.

5. A system according to claim 3 provided with a control chamber coaxial with said master cylinder, said means for closing said first-named valve and moving said tube comprising a plunger in said control chamber having one end exposed to pressure in said master cylinder, said control chamber being connected to said high pressure chamber.

6. A system according to claim 3 provided with a control chamber coaxial with said master cylinder, said means for closing said first-named valve and moving said tube comprising a plunger in said control chamber having one end exposed to pressure in said master cylinder, said control chamber being connected to said high pressure chamber, said fluid pressure responsive means comprising a second cylinder coaxial with said master cylinder and spaced from the end thereof opposite said body, a booster plunger mounted in said second cylinder forming with one end thereof a booster chamber communicating with said high pressure chamber, and means connecting said booster plunger to said master cylinder plunger whereby force will be transmitted from said booster plunger to said master cylinder plunger upon the generation of pressure in said high pressure chamber to assist said pedal operable means in moving said master cylinder plunger.

7. A booster brake system for a motor vehicle having a pair of sets of wheel cylinders, a manually operable master cylinder connected to transmit fluid under pressure to one of said sets of wheel cylinders, a booster motor energized by air under pressure, a second master cylinder operatively connected with said booster motor and connected to transmit hydraulic fluid under pressure to the other set of wheel cylinders, a hydraulic cylinder and piston communicating with said second master cylinder and operatively connected to assist said manually operable master cylinder to increase the pressure of the hydraulic fluid transmitted to said one set of wheel cylinders, a source of air under pressure, valve means connected between said booster motor and said source and operative to transmit pressure from said source to said booster motor and to relieve the pressure from said booster motor, and common means responsive to the hydraulic pressure generated by said manually operable master cylinder to urge said valve means to increase the power of said booster motor and responsive to the hydraulic pressure produced by said second master cylinder to urge said valve means to decrease the power of said booster motor.

8. A system according to claim 7 wherein said common means comprises a pressure responsive device having opposite sides exposed respectively to pressures in said manually operable master cylinder and in said second master cylinder.

9. A system according to claim 7 wherein said common means comprises a pressure responsive device having opposite sides exposed respectively to pressures in said manually operable master cylinder and in said second master cylinder, said valve means comprising a pair of valves in axial alinement with said manually operable master cylinder and connected to said pressure responsive device.

References Cited in the file of this patent

UNITED STATES PATENTS

| | | |
|---|---|---|
| 1,903,973 | Boughton | Apr. 18, 1933 |
| 2,260,490 | Stelzer | Oct. 28, 1941 |
| 2,322,063 | Schnell | June 15, 1943 |
| 2,328,637 | Freeman | Sept. 7, 1943 |
| 2,328,684 | Schnell | Sept. 7, 1943 |
| 2,373,272 | Stelzer | Apr. 10, 1945 |
| 2,383,682 | Price | Aug. 28, 1945 |
| 2,525,426 | Rockwell | Oct. 10, 1950 |
| 2,799,140 | Osborne | July 16, 1957 |

FOREIGN PATENTS

| | | |
|---|---|---|
| 753,839 | Germany | Aug. 9, 1954 |